March 8, 1960     W. R. MELLEN     2,927,746
TOROIDAL AIRCRAFT
Filed May 29, 1956     4 Sheets-Sheet 1
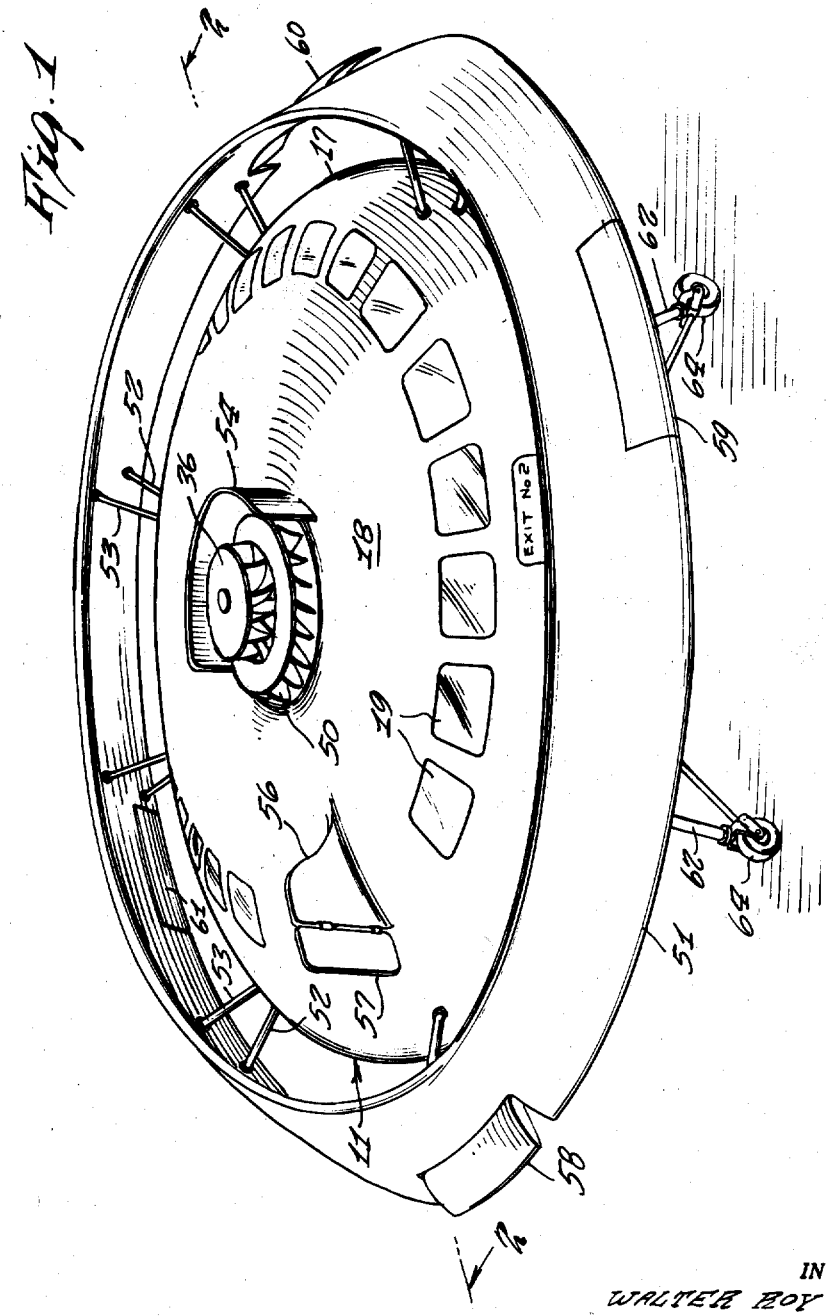
INVENTOR.
WALTER ROY MELLEN
BY
Carl Miller
ATTORNEY

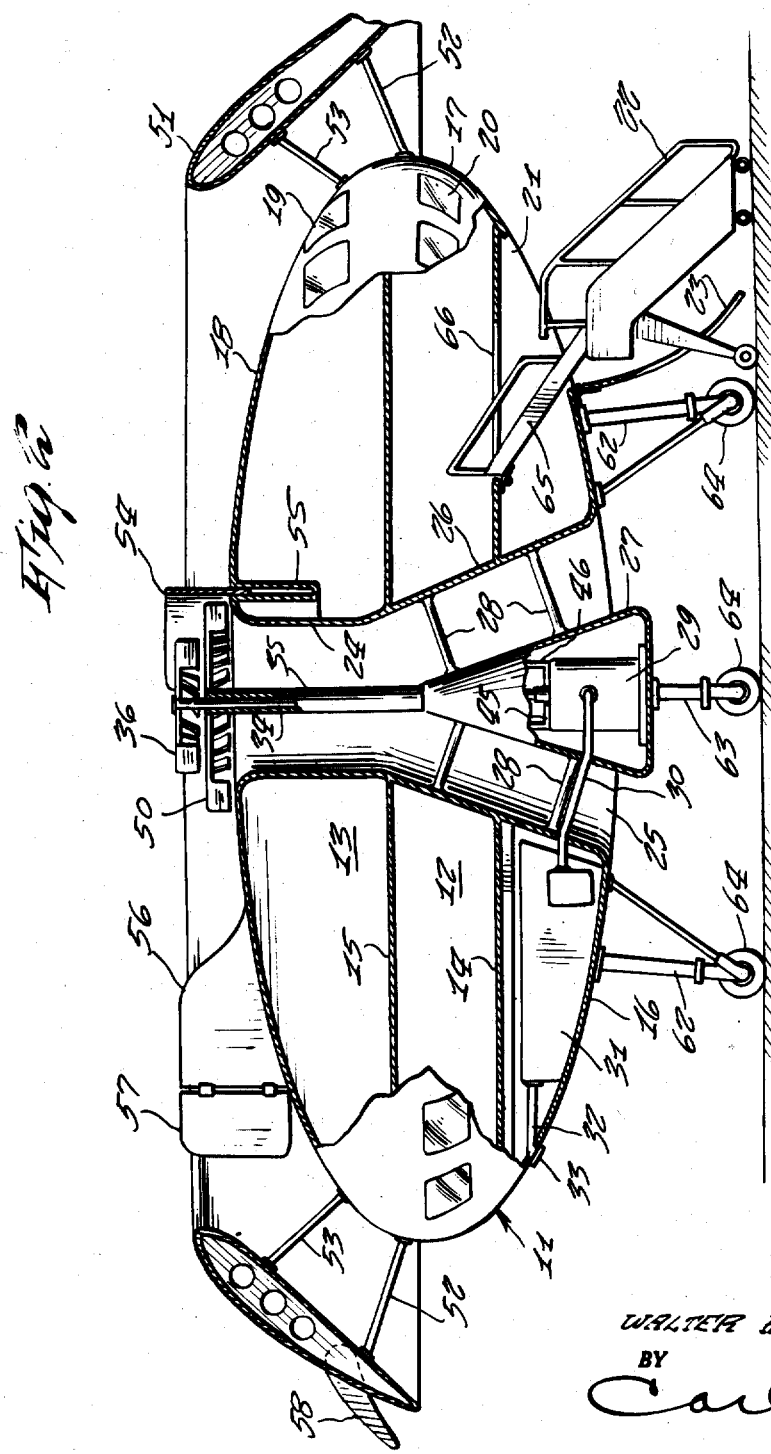

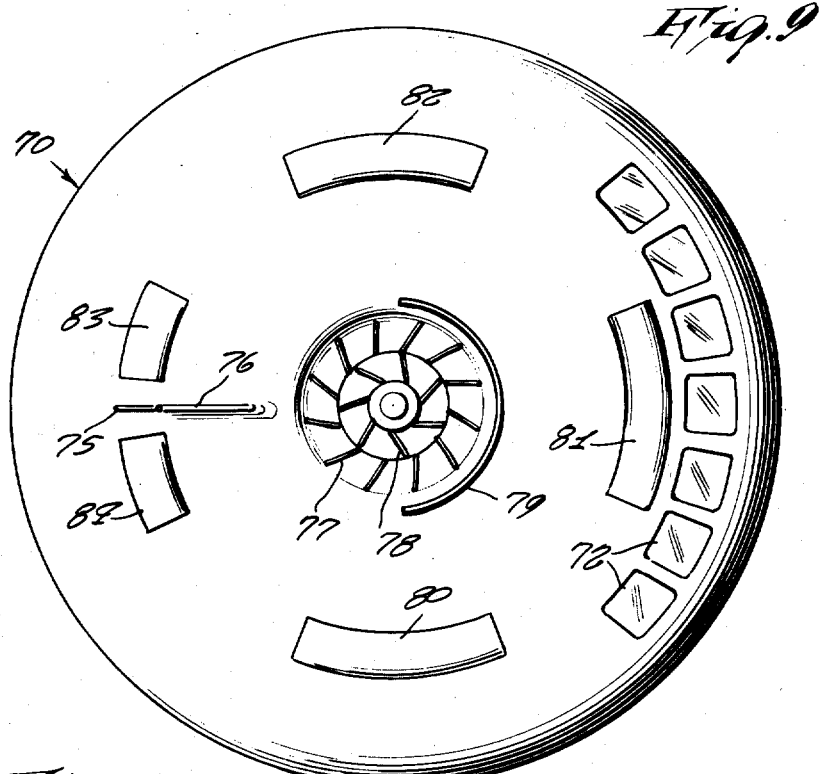

United States Patent Office 2,927,746
Patented Mar. 8, 1960

2,927,746

TOROIDAL AIRCRAFT

Walter Roy Mellen, Roslyn Heights, N.Y.

Application May 29, 1956, Serial No. 588,045

2 Claims. (Cl. 244—12)

This invention relates to aircraft of the heavier than air type, and particularly to what I choose to term toroidal aircraft.

The main object of my invention is to produce a type of aircraft which is primarily built in the form of a toroid, and which therefore has several advantages lacking in conventional types of the airplanes and the like.

An ancillary object of my invention is to have a toroidal aircraft which requires a minimum of driving power to operate it in contrast with that required by other aircraft of similar types.

Another object of this invention is to have such an aircraft which by the very nature of its construction and form is free from dangerous exposure of operative parts as in rotating wing craft.

A further object of the invention is to have an aircraft as indicated which requires very small landing and take-off space.

Still another object of the invention is to have such aircraft which may safely be operated near other aircraft of the same type.

It is, of course, an important object of the invention to have a toroidal aircraft as mentioned which is simple in overall form and simple, yet effective to operate.

Other objects and advantages of my invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a perspective view of a toroid aircraft made according to my invention and embodying the same in a practical form;

Figure 2 is a vertical section of the same aircraft as taken on line 2—2 in Figure 1;

Figure 3 is a side elevation, partly in section of the rotor drive gearing of the aircraft of Figures 1 and 2;

Figure 4 is a top plan view of the same drive gearing as seen from above in Figure 3;

Figure 5 is a vertical section of the gearing as taken on line 5—5 in Figure 3;

Figure 6 is another vertical section thereof as taken on line 6—6 in the same Figure 3;

Figure 7 is a reduced diagram, partly sectional based on the aircraft of Figures 1 through 3 showing the nature of the air flow of the craft in active operation;

Figure 8 is a bottom view or plan of the same as seen from below in Figure 7;

Figure 9 is a top plan view of a modification of the aircraft; and

Figure 10 is a side elevation of the aircraft of Figure 9.

Throughout the views, the same reference numerals indicate the same or like parts and features.

In aeronautics, it is well known to have vanes and wings or blades upon propellers and rotors for lifting and propelling aircraft, and the type of vanes or wings often impart the name and nature of the craft to the type involved. In general, such craft have more or less exposed moving wings and vanes or blades, and in this respect are very vulnerable to damage from many sources and therefore dangerous in their very nature. It has occurred to me that certain features of air rotors and the like should be capable of useful effect and operation when located in a more sheltered construction such as an actual saucer or toroid type of structure and the like to solve the problems of danger and lift. As a result, I have developed a toroid aircraft as already outlined, which will now be described in detail in the following, due reference being had to the accompanying drawing previously mentioned.

Hence, in the practice of my invention, a hollow toroid body generally indicated at 11 contains two superposed passenger chambers 12 and 13 having the individual floors 14 and 15 and outer walls, lower wall 16 peripheral rounded wall 17 and top or roof 18. The peripheral wall 17 contains the upper and lower rows of windows 19 and 20 for the two chambers, while an opening 21 is accessible for entry of passengers by way of portable stairs 22 when the bottom door 23 is dropped open as shown. Upwardly through the axial center of the aircraft body 11 extends an air drive column 24 which is substantially cylindrical and tubular in its upper portion while flaring conically outward in the downward direction and forming a large air intake opening 25 at the lower end of the flaring portion 26.

Within the central air column 24, 26 and projecting down thru opening 25 is a conical motor housing 27 secured to the walls of the air column by radial rods 28, 28 and containing a driving motor 29, preferably of the fuel combustion type having a feed pipe 30 connected thereto and running from a fuel tank 31 having a filling pipe fixture 32 closed by a removable cap 33 exposed upon the lower body wall 16. Manual controls and valves, throttles and the like are omitted for clarity in the drawing because such control means must be understood as they are well known and do not necessarily include any new features inherent in the invention as such.

Motor 29 has a drive shaft 34 extending upwardly through rotor tube 35, through the upper end of motor housing 27 and at its upper end carrying a radial blower fan 36. As best seen in Figures 3 to 6, inclusive, the tube 35 which is rotatable about shaft 34 has a crown gear 37 upon its lower end meshing with a pair of spur gears 38, 39 mounted upon aligned shafts 40, 41 extending rotatably at their inner ends into the central stationary ring-yoke 42 surrounding shaft 34 but out of contact therewith. The outer ends of these independent shafts 40, 41 are rotatably supported in the upper bearing ends 43, 44 of a pair of opposite brackets 45, 46 fixed upon motor 29. Within these bracket bearings 43, 44 are fixed further spur gears 47, 48 upon these shafts, which in turn mesh with a second larger crown gear 49 fixed upon vertical rotor shaft 34 a distance below the first mentioned crown gear 37 upon tube or sleeve 35. These crown gears may well be bevel gears, if desired, but in any event, rotation of drive shaft 34 with its gear 49 naturally rotates spur gears 47 and 48 in opposite directions and thus also gears 38 and 39 with them, the latter gears in turn rotating gear 37 in the opposite direction to that of gear 49. The sleeve 35 is thus rotated by gear 37 in the opposite direction to shaft 34 with its upper fan rotor 36, and as sleeve 35 rotates in the opposite direction, this also holds for the second fan rotor 50 which surmounts the sleeve. The two fan rotors thus rotate in opposite directions and tend to sweep the air outwardly in radial directions off the rounded roof 18 of the aircraft body 11.

As the mentioned aircraft body is formed with an airfoil profile, this creates a low pressure area upon the flat dome 18, but the lifting effect is increased by disposing about the toroid body a circular wing 51 inclined outwardly downward in section and secured in position by a series of pairs of anchoring rods 52, 53. This wing is located at the proper raised level to intercept the radial air currents set up by rotors 36 and 50, and to give direction to the craft under such air drive. Three features are included in the structure, the first being a curved upright air shield 54 which may be raised from or lowered partly or fully into a curved recess 55 in the top of the craft. This shield normally cuts off the horizontal air drive from the rotors in the forward direction opposite to the rudder 56 with its movable rudder member 57 while freely allowing such driving air to strike the wing 51 about and rearwardly of the rudder structure that form the second feature. The third feature includes the four ailerons 58, 69, 60 and 61 that serve to tilt the whole craft in the direction of the particular aileron that is swung outward as in the case of rear aileron 58 in Figures 1 and 2. The controls for operating the rudder member 57 and the ailerons are omitted as well known and understood as included.

Beneath the craft are fixed a group of roller studs or legs 62, 62, 63 with ground rollers 64 for supporting the craft when on the ground at port. The door 23 in the bottom 16 allows the inside stair 65 to swing down through floor opening 66 to rest on the portable stairway 22 already referred to above. When the craft is to be raised into the air, the motor 29 is started, causing both drive fan rotors 36 and 50 to drive air away from the center out from the rounded top 18 of the body 11 against the inclined under surface of ring-shaped wing 51, producing a double lift by means of low pressure over the curved top surface 18 and upward push beneath wing 51. The shield 54 governs the amount of air allowed to reach more or less of the wing 51, while the swingable rudder member 57 serves to steer the craft, and the ailerons 58 to 62 serve to tilt the whole as desired and give rising angle to the craft. The action may be followed diagrammatically in Figures 7 and 8, in which arrows 67 indicate how the air rises through the central air column to fan drive rotors 36 and 50 and how the latter drive the air radially outward as per arrows 68 to impinge on the inner surface of wing 51, and rebound downward as per arrows 69. The roller studs are withdrawn so as to avoid projecting to any great extent, while the windows are omitted for simplicity in these diagrammatic views. As the air drive rotors rotate in opposite directions, they eliminate any tendency of spinning the craft about a vertical axis and allow easy steering by the rudder.

In Figures 9 and 10 are shown a modification of the aircraft in which the toroid hollow body indicated at 70 has the same general outline as the body 11, with the lower and upper windows 71 and 72 for the passenger chambers and the lower door 73, as well as the landing gear 74 resembling the gear 62, 63, 64 described before. A dirigible rudder 75 hinged to stationary rudder 76 serves to steer the craft while the fan rotors 77, 78 are similar to rotors 36, 50. There is in this case no spaced circular wing deflector, although it has the upper front curved air shield 79. Instead of the four ailerons on the circular wing deflector 51, this form of aircraft has at least as many upper deflectors 80, 81, 82 and the rear pair 83, 84, which are operated by raising them individually as deflector 81. The motor drive with shaft and sleeve and gears are as described, and the central air column drawing up air to the fan rotors is also as previously described in connection with Figures 1 to 8. Deflection of the air downward around body 70 is obtained partly by the tendency an air stream has to follow a curved surface and partly by boundary layer control obtained from the air being drawn in under the lower surface of the body 70.

Manifestly, variations may be resorted to, and parts and features may be modified or used without others within the scope of the appended claims.

Having now fully described my invention, I claim:

1. A toroidal aircraft including the combination of a hollow toroid body circularly developed about an upright central axis, the toroid body having an upwardly convex top and a downwardly convex bottom with passenger compartments located within and windows for the compartments exposed upon the exterior of said body, landing gear with roller studs secured beneath the latter, a stationary rudder mounted upon the top and provided with a hinged rudder member connected thereto, a circular baffle surrounding the toroid body in uniformly spaced apart relation, said baffle being downwardly and outwardly inclined and located with its upper inner edge or periphery located at a distance above the top of said body and the lower outer edge or periphery disposed substantially at the level of the widest diameter of said body with means for securing said baffle rigidly thereto, means for directing air inwardly beneath the bottom and upwardly axially through said body and then outwardly from the center upon the top to alter the air pressure beneath said bottom and inversely alter the air pressure upon said top, said means comprising a central vertical passage means extending axially upward through said body and having the lower portion thereof conical in form so as to flare downwardly, and means for forcibly drawing the air upwardly through said vertical passage means including an upwardly tapering motor housing in the flaring portion of said passage having a prime mover with a driven shaft extending upwardly through said passage with fan rotor means mounted upon the upper end thereof for rotation by said shaft immediately above the level of said top, said top having an arcuate recess extending a short distance downwardly thereinto with a correspondingly arcuate air shield curved about the central axis of the toroid body equipped to be raised upwardly from and lowered down into said recess to varying extent in a position diametrically opposite said rudder.

2. A toroidal aircraft according to claim 1, wherein the prime mover has plural shaft means extending upwardly through the vertical air passage and the fan rotor means comprising a pair of oppositely driven fan rotors upon the upper ends of the plural shaft means for driving air radially outward over said top, and the baffle has a plurality of aileron flaps forming movable control members upon a plurality of spaced positions on the baffle for modifying the flight of the aircraft at will.

References Cited in the file of this patent
UNITED STATES PATENTS

| | | |
|---|---|---|
| 1,776,994 | Chattin | Sept. 30, 1930 |
| 1,931,753 | Darbyson | Oct. 24, 1933 |
| 2,480,040 | Mitchell | Aug. 23, 1949 |
| 2,494,368 | Steele et al. | Jan. 10, 1950 |
| 2,547,266 | Hoglin | Apr. 3, 1951 |
| 2,563,047 | Kisner | Aug. 7, 1951 |
| 2,718,364 | Crabtree | Sept. 20, 1955 |
| 2,726,829 | Hillis | Dec. 13, 1955 |